Feb. 24, 1942.     M. WALLACE     2,273,914
RADIO NAVIGATION SYSTEM
Filed April 26, 1938     6 Sheets-Sheet 1
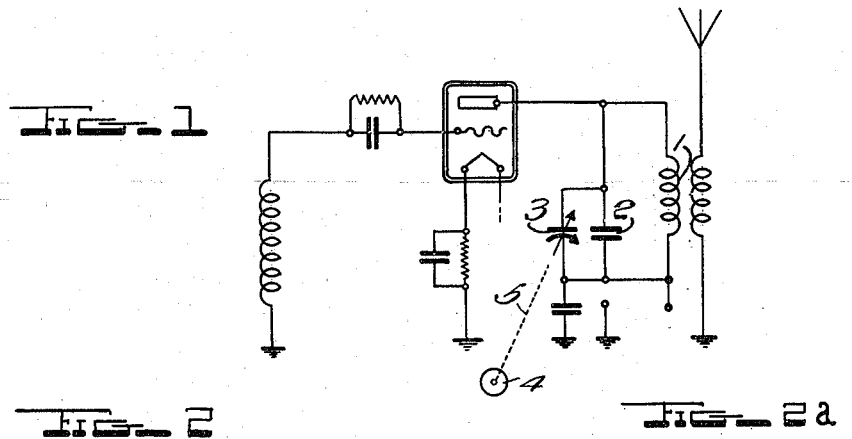
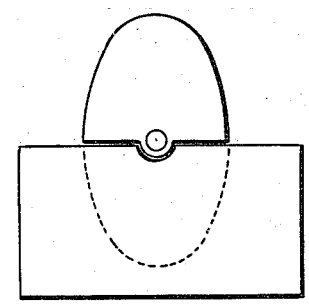
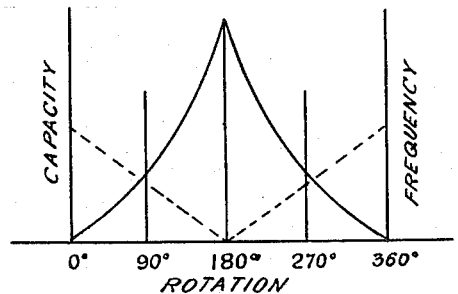
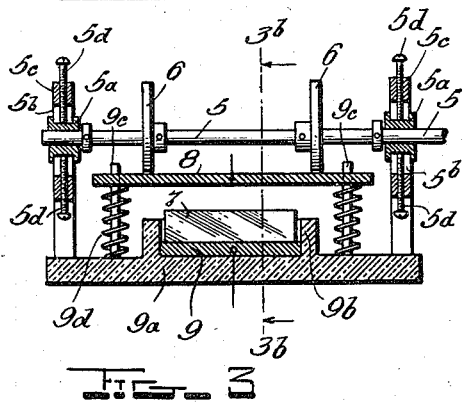
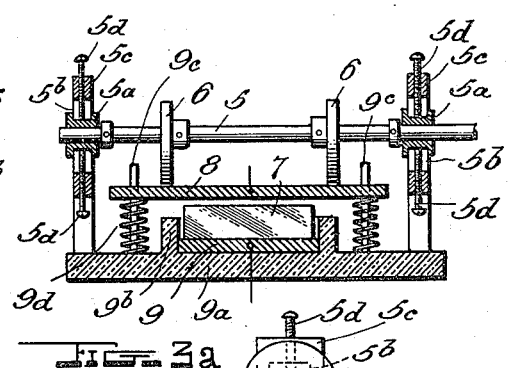
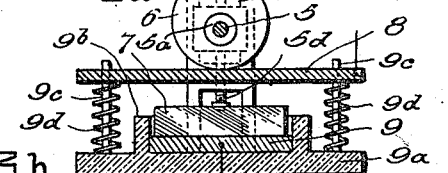
INVENTOR.
Marcel Wallace
BY John B. Brady
ATTORNEY

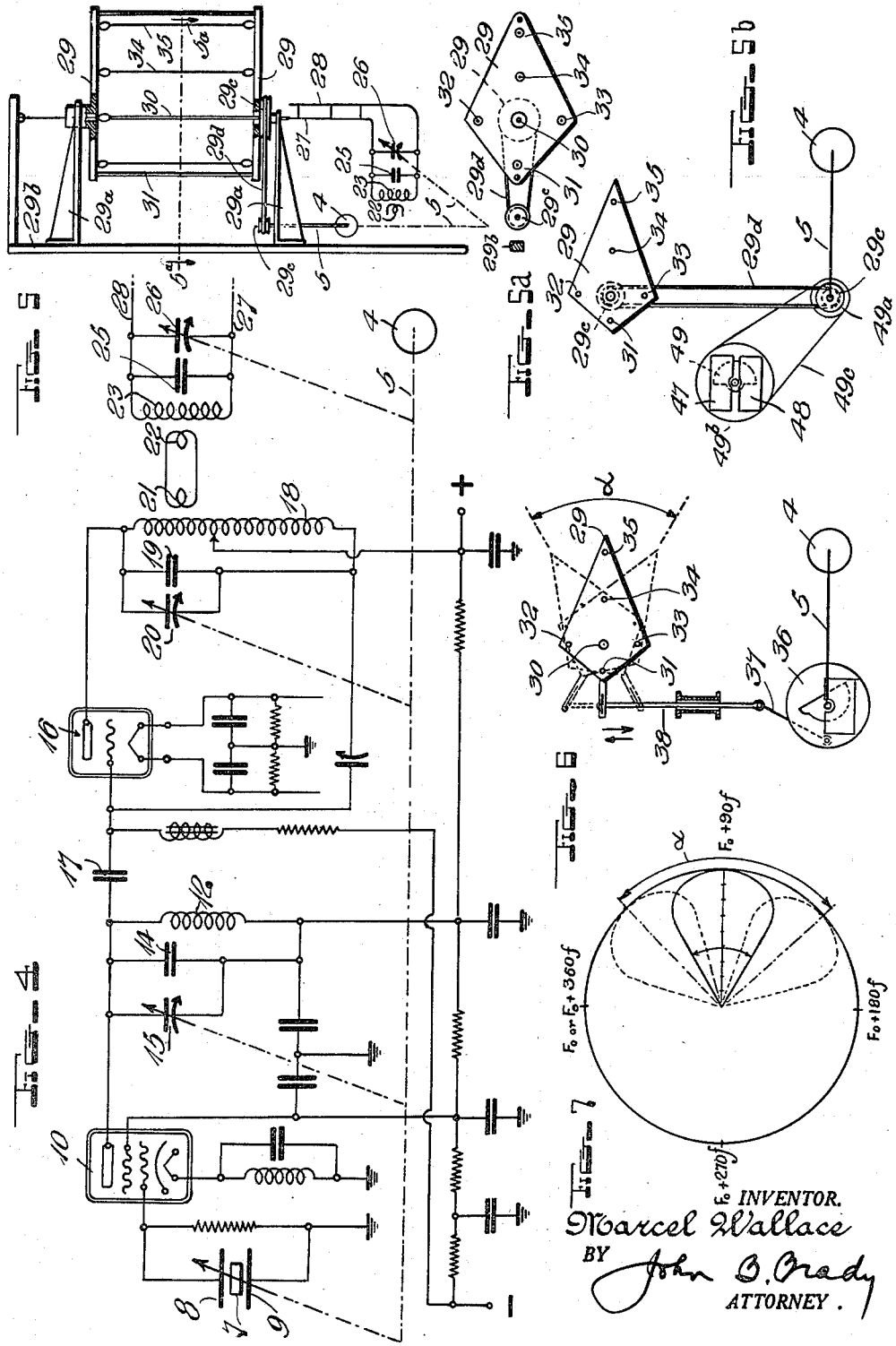

Feb. 24, 1942.    M. WALLACE    2,273,914
RADIO NAVIGATION SYSTEM
Filed April 26, 1938    6 Sheets-Sheet 3
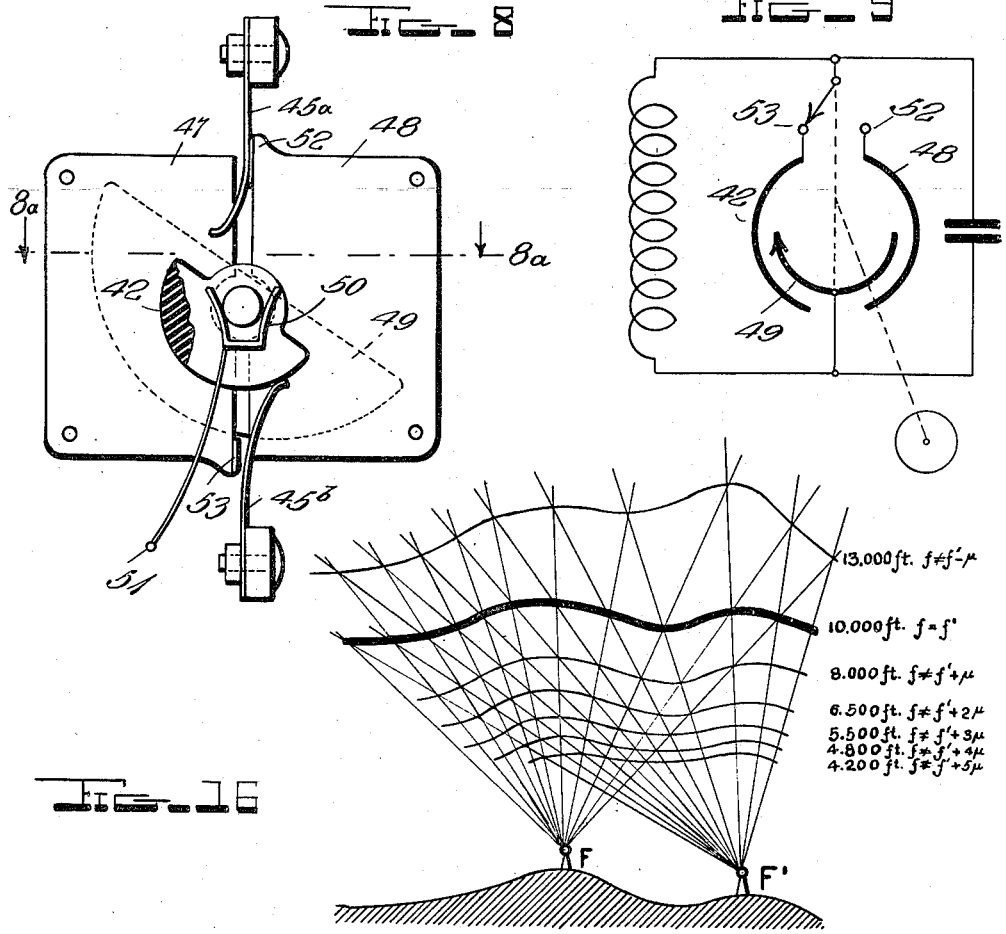
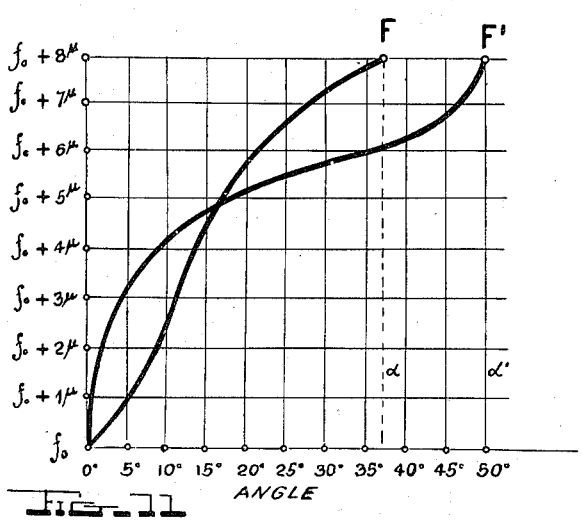
INVENTOR.
Marcel Wallace,
BY John C. Brady
ATTORNEY.

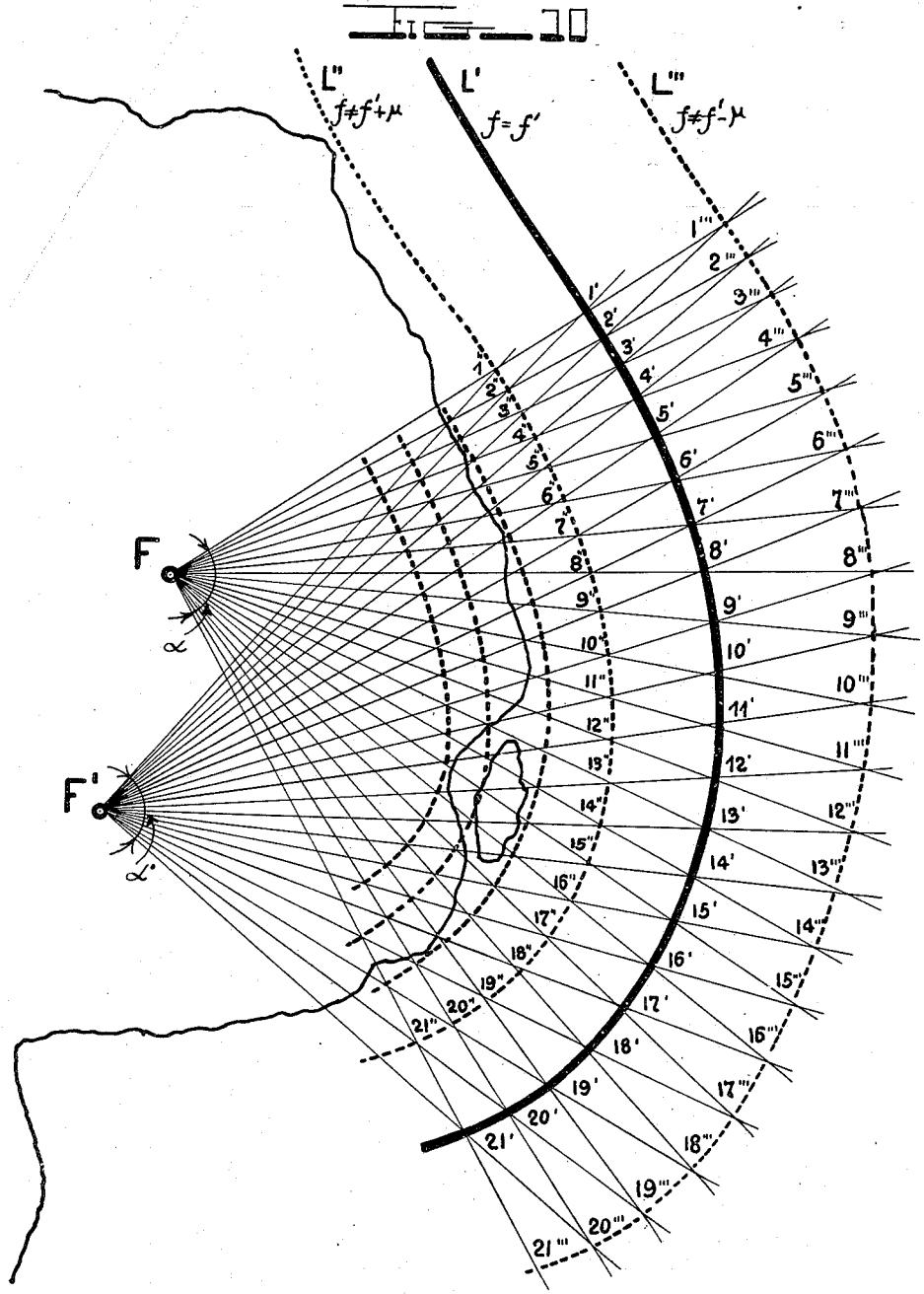

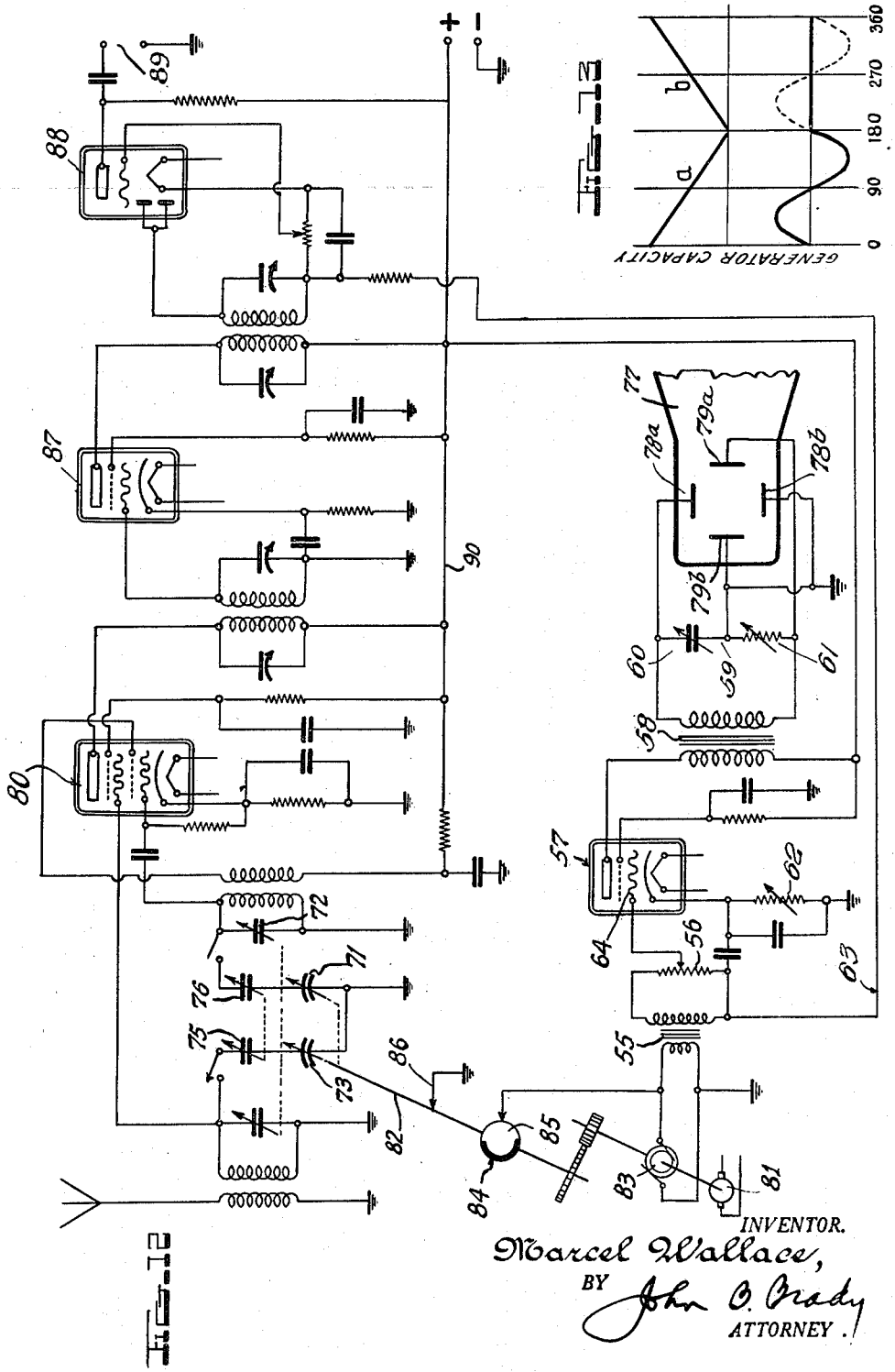

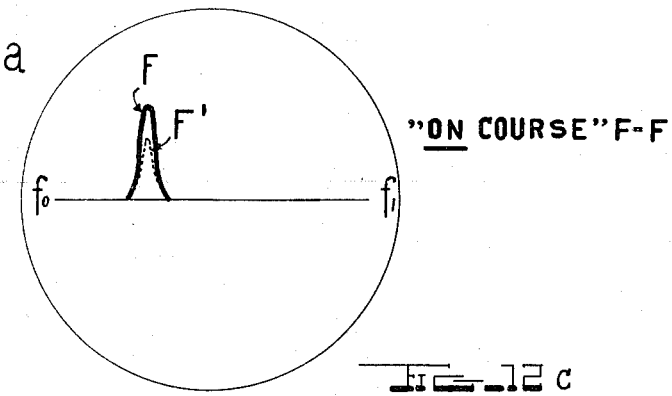
Fig. 12a "ON COURSE" F=F'
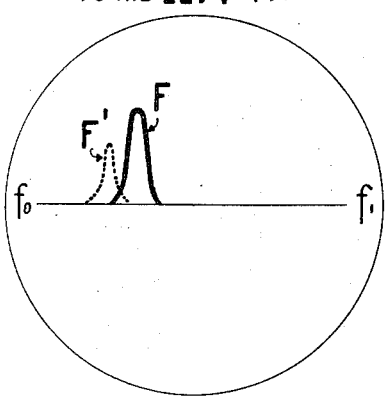
Fig. 12b TO THE "LEFT" F>F'
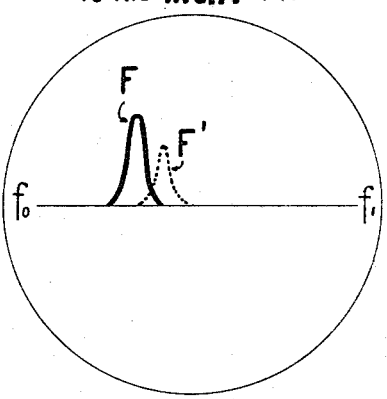
Fig. 12c TO THE "RIGHT" F<F'
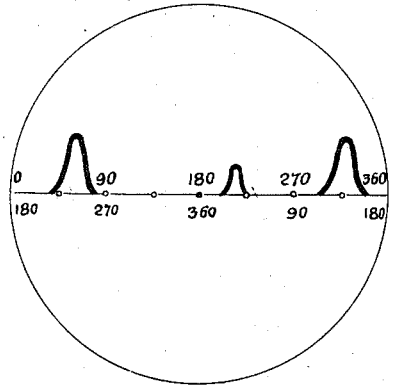
Fig. 14
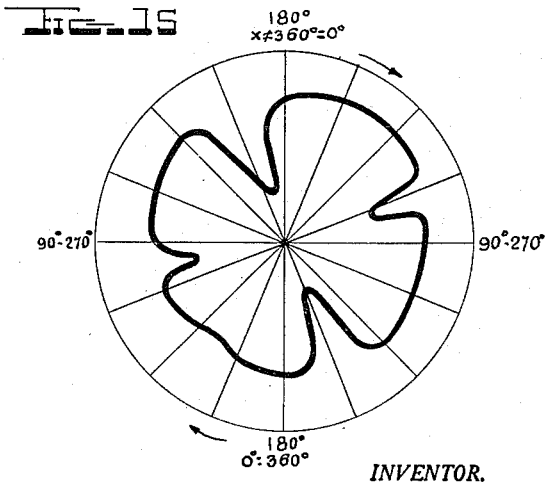
Fig. 15
INVENTOR.
Marcel Wallace,
BY John B. Brady
ATTORNEY.

Patented Feb. 24, 1942

2,273,914

UNITED STATES PATENT OFFICE 2,273,914

RADIO NAVIGATION SYSTEM

Marcel Wallace, New York, N. Y., assignor, by direct and mesne assignments, to Panoramic Radio Corporation, a corporation of New York Application April 26, 1938, Serial No. 204,470

27 Claims. (Cl. 250—11)

My invention relates broadly to systems of radio navigation and more particularly to an improved method and apparatus for use in radio navigation systems.

One of the objects of my invention is to provide a system of transmitting intelligence by radio without modulating the carrier but characterized by distinctive variations of frequency of the carrier.

Another object of my invention is to provide a system of radio beacons giving a distinctive signal receivable by a panoramic signal receiver which cannot be mistaken for an ordinary telegraph or telephone modulated signal.

Still another object of my invention is to establish a system of radio beacons which have distinguishing characteristics from each other without employment of any modulation.

A further object of my invention is to provide a system of radio beacons which will instantaneously and simultaneously inform an observer on a mobile body on which the beacon signals are received, as to the direction from which each beacon is received.

Another object of my invention is to provide an arrangement of apparatus for receiving variable carrier frequency beacons on a mobile body so as to give direct indications as to the position of the observer in relation to each beacon received.

A further object of my invention is to provide a system of radio beacons which will give precise indications all around a given point, or 360° of the circle, instead of the beacons as heretofore used which provide indications on two or four lobes only, making it unnecessary to take bearings under conditions which make the taking of bearings impracticable.

Another important object of my invention is to create with the aid of a plurality of beacons, special courses through danger zones or for indicating to a pilot employing the system of my invention on aircraft a safe travelling path, which may be rectilinear or curvilinear at will, and capable of modification according to requirements.

Still another object of my invention is to provide a radio transmission system having a radiating circuit and a frequency determining circuit with means for synchronously and simultaneously varying both the frequency of the frequency determining circuit and the frequency of the radiating circuit.

Still another object of my invention is to provide a circuit arrangement for a cathode ray oscillograph visual indicating system in a radio receiving apparatus by which signals of a multiplicity of transmitting stations may be reproduced in a substantially circular path over substantially 360° of the screen of the cathode ray oscillograph.

A still further object of my invention is to provide an arrangement of electromechanical vibrator having means for varying the frequency of operation thereof associated with a radiating system having means for synchronously varying the frequency and direction of an emitted carrier from the radiating system.

Other and further objects of my invention reside in the coordinated circuit arrangements of an oscillator frequency control device and a radiating system frequency control circuit and a visual indicating radio receiving system cooperative therewith as set forth more fully in the specification hereinafter following by reference to the accompanying drawings in which:

Figure 1 shows the fundamental circuit for a transmitter employed in the system of my invention; Fig. 2 shows one construction of the variable capacity system which controls the frequency range of operation of the transmitter; Fig. 2a shows a system of curves illustrating the characteristics of the transmitter of Fig. 1; Fig. 3 illustrates one arrangement of electromechanical vibrator having means for periodically varying the frequency thereof according to the system of my invention and showing the position of the frequency adjusting means for one limit of frequency with respect to which the electromechanical vibrator may be controlled; Fig. 3a is a view of the electromechanical vibrator shown in Fig. 3 but illustrating the position of the parts for the opposite limit of the frequency range with respect to which the electromechanical vibrator may be controlled; Fig. 3b is a transverse sectional view taken on line 3b—3b of Fig. 3 through the electromechanical vibrator control apparatus; Fig. 4 is a diagrammatic circuit arrangement showing the manner of coordinating means for continuously and periodically varying the frequency of the electromechanical vibrator circuit and synchronously varying the frequency of a radiating system connected with a transmission circuit which is controlled by the electromechanical vibrator; Fig. 5 is a schematic view of the antenna system employed in the transmission system of my invention; Fig. 5a is a transverse sectional view taken on line 5a—5a of Fig. 5; Fig. 5b illustrates a modified arrangement of directive antenna system which may be employed in the system of my invention; Fig. 6 is a view illustrating another manner of coordinating the tuning system connected with the radiating system with the displacement of the directive antenna system; Fig. 7 shows the field pattern of the continuously rotating frequency varying beam employed in the transmission system of my invention; Fig. 8 illustrates a form of double condenser used in the periodically varying tuning system employed in the transmission circuit; Fig. 8a is a horizontal section taken on line 8a—8a of Fig. 8; Fig. 9 illustrates the electrical circuit in which the double condenser of Fig. 8 is connected; Fig. 10 is a schematic view showing the manner in which the transmission system of my invention may be arranged to establish a curvilinear radio frequency path for marking a curvilinear navigable course; Fig. 11 is a chart showing the variation of the frequency of each of the stations F and F', illustrated in Fig. 10, for each degree of rotation of the antenna; Fig. 12 schematically illustrates the circuit arrangement of a panoramic radio receiver as set forth more fully in my copending application, Serial No. 196,520, filed March 17, 1938, for Panoramic radio receiving system, and showing the manner of controlling the electrodes within the cathode ray oscillograph for producing the readings on the screen of the cathode ray oscillograph which directly provide the observer with a sense of direction of the transmitting sources; Figs. 12a, 12b and 12c illustrate the screen of a cathode ray oscillograph used with a panoramic radio receiver employed in the circuit arrangement of Fig. 12; Fig. 12a illustrating the visual record for an on course condition where the mobile body follows the path shown in heavy line in Fig. 10, Fig. 12b showing a condition where the mobile body moves to the left of the course, and Fig. 12c a condition wherein the mobile body moves to the right of the course; Fig. 13 is a chart illustrating the relationship of the generated alternating current impressed upon the electrodes of the cathode ray oscillograph shown in Fig. 12 and the variation capacity of the tuning condensers in the circuits of the panoramic receiver illustrated in Fig. 12; Fig. 14 is a view of the screen of the cathode ray oscillograph showing the manner in which azimuth relationship of the mobile receiver with respect to signalling stations may be represented on the screen; Fig. 15 illustrates the manner in which both direction and position of the mobile body with respect to the transmitting sources may be visually indicated on the screen of the cathode ray oscillograph; and Fig. 16 illustrates a diagrammatic view showing the altitude levels over a hilly territory.

One of the applications of the panoramic radio receivers such as described in my copending application, Serial No. 196,520, filed March 17, 1938, resides in the combination with specially designed radio beacons of continuously changing carrier frequency.

Many types of radio beacons have been developed, with which accurate information can be conveyed to an observer concerning the position of a mobile body equipped with a receiver operative to determine the position of the mobile body in relation to the beacon transmitter. The majority of the methods heretofore used are confined to the modulation of such beacons or to a certain synchronization in the movement of one or several beacons which are modulated in such a manner as to impart a knowledge of their instantaneous position. These methods require listening to one of these beacon stations and, if a position must be determined, the taking of bearings with respect to a plurality of such beacons. Valuable time is lost in tuning the ordinary type of receiver from one beacon to another and such observations must generally be made when the pilot's attention is demanded by navigation of the aircraft.

In my present invention, I employ special types of beacons, several of which may be simultaneously received on a panoramic receiver so as to impart instantaneous bearings to an observer.

These beacons are of a varying frequency and are individually characterized by the limits of frequency variation as well as their rate of variation per unit of time. For example, beam #1, may vary from frequency $F_1$ to $F_2$ and back to $F_1$, completing the cycle in five seconds. Beam #2 may vary from $F_3$ to $F_4$ and back to $F_3$ in ten seconds, etc. Two beam stations may use the same frequency limits but their period for a complete cycle may be different, or vice versa: the beacon stations may have the same period but they may vary between two different frequency limits. Such variation renders each station recognizable and the characteristics of the stations thus received allow identification of the stations on a panoramic receiver where the signals of a plurality of beacons can be simultaneously received visually. Such manner of characterizing each beacon removes the necessity to characterize each beacon in another manner, such as through special type of modulation for each beacon. In a more elaborate type of beacon the variation of frequency is synchronized with the rotation of the beacon over a certain definite angle, so as to impart information concerning the location of the station to an observer, according to the frequency of the maximum or of the minimum signal receivable in any particular location.

The relationship between the angular variation and the frequency variation may be linear or non-linear as it will be shown hereinafter. I hereinafter describe in connection with my invention how several types of such variable frequency radio beacons and their special applications and advantages in connection with a panoramic receiver may be employed. I will describe hereinafter the apparatus used in connection with my invention.

In order to fully understand the explanation of my invention, reference is made to my copending application, Serial No. 196,520, supra, for the details of the arrangement of the panoramic receiver employed with the system of my invention. The panoramic receiver is an instrument which visually indicates on an oscillograph screen a plurality of signals simultaneously indicating the variation of the field strength and of the frequency of the simultaneously operating transmitting stations within the frequency range which is periodically swept by the receiver.

In order to simplify the task of the pilot of an aircraft, I employ the principle that it is advantageous to use only one of the senses, that is, sight, which is the most precise and reliable sense, and which eliminates as much as possible errors resulting from poor judgment in hearing above the noises of an aircraft. Sight permits any reasonable number of simultaneous indications, whereas hearing allows only one.

This is the reason why in the beacon transmitters employed in the system of my invention I am not concerned with the modulation of the signals. This greatly simplifies the transmitting apparatus required. By the use of simple beacons, transmitting a signal in all directions, this signal constantly varying in frequency at a definite rate and in a periodic manner, the transmitter provides for navigators, a series of bearings, which will permit orientation by aid of a panoramic compass such as described in my copending application, Serial No. 196,520, supra.

I accomplish this by the use of a transmitter in which the tuning element, such as a condenser, or a variometer type of inductance, is continuously rotating so as to vary the carrier frequency of the station within certain limits at a definite rate of time. The transmitter may include an oscillation generator including a frequency determining element such as an electromechanical vibrator, a radiating circuit connected with the generator with means for coordinating the periodic tuning of the radiating circuit synchronously with the variation in frequency of the electromechanical vibrator in the oscillation generator circuit. The antenna which connects with the transmitter has a directional characteristic and the direction of propagation is periodically varied synchronously with the tuning of the radiating circuit and with the variation in frequency of the electromechanical vibrator. The receiver employed provides means for visually indicating on the screen of the cathode ray oscillograph the direction of the variable frequency beacon transmitters and the location of the receiver with respect to the transmitters. The movement of the cathode ray beam may be so controlled synchronously with the periodic tuning of the panoramic receiving circuit that the pattern of the reproduced signals on the cathode ray oscillograph is substantially circular, thereby giving a sense of direction as well as location of the sources with respect to the receiving station by the visual reproduction on the screen of the cathode ray oscillograph.

Fig. 1 shows a simple electron tube transmitter of the self-excited type in which the frequency is determined by inductance 1 and tuning condensers 2 and 3. Condenser 2 is permanently adjusted and condenser 3 is continuously rotated by means of a driving motor 4 with proper reduction so as to vary the frequency of oscillation of this transmitter between set limits $F_1$ and $F_2$ back to $F_1$ in a definite length of time.

Various shapes of condenser plates can be used to obtain the variation desired. Fig. 2 shows a type of plate resembling the semi-oval which creates a non-linear variation of capacity according to the full lines shown in Fig. 2a, but a linear variation of frequency according to the dotted lines illustrated in Fig. 2a. The driving motor used in connection with the rotating condenser is provided with one or several sets of reduction gears such as worm drives to obtain the speed required. These are not shown in the drawings as they are built into the motor and are enclosed by the outline designating the motor symbol in the drawings.

When a piezo electric crystal oscillator is used the periodical variation can be obtained by periodically varying the gap between the crystal and one of the electrodes. A quartz crystal can be varied in this manner over a frequency of a few kilocycles; for example, a 3.75 mg. crystal can be varied about 7 kilocycles in this manner. If such a crystal is used in connection with one or more frequency multiplying stages multiplying its frequency, let us say to eight times its fundamental, for example, 30 megacycles, the periodical variation obtainable is of 56 kilocycles.

Figs. 3, 3a and 3b show the arrangement of a piezo electric crystal in which a set of cams 6 rotated by shaft 5 periodically and gradually cause the variation of the air gap between the crystal 7 and the upper electrode 8, thus causing a continuous variation of frequency. Such a crystal used with one of the usual oscillators will give a fundamental varying continuously. For some purposes it may be necessary to vary the movement of the electrode gradually over a certain limit and suddenly bring it back to the original position, or to vary this frequency at a non-linear angular rate. Any such combination can be obtained by the proper shape of the cams 6. In order that the frequency range over which the piezo crystal may vary in frequency may be precisely controlled, I provide bearings 5a for shaft 5 which are mounted in slots 5b in standards 5c. The standards 5c contain sets of adjustable screw devices 5d by which the position of bearings 5a may be adjusted. This adjustment enables the limits of the spacial relation of upper electrode 8 with respect to the surface of piezo electric crystal 7 to be determined. In Fig. 3, I have shown the upper electrode 8 displaced at its maximum distance from the surface of crystal 7, while in Fig. 3a, I have shown the upper electrode 8 shifted to a position of minimum spacial relation with respect to the surface of piezo crystal 7. The lower electrode 9 of the piezo electric crystal apparatus is mounted on an insulated base 9a which may be provided with upstanding wall members 9b of insulation material which serves to confine piezo electric crystal 7 in position. The base 9a carries upstanding pins 9c which are surrounded by coil springs 9d, tending to normally separate upper electrode 8 from the upper surface of piezo electric crystal 7 and continuously urge upper electrode 8 away from the upper surface of crystal 7 in opposition to the movement of the set of cams 6. In order to maintain a constant antenna current in the transmitter for all these frequencies, I prefer to also periodically tune the other circuits of the transmitter if the frequency variation is relatively important so as to obtain a constant current in the antenna system. I do this by using the same shaft 5 for the variation of all the condensers.

Fig. 4 shows such a transmitter in which 7, 8, 9 represents a continuously and periodically varying piezo electric crystal which produces oscillations of periodically varying frequency in the circuit of tube 10. The plate coil 12 of this tube is tuned to the fundamental or harmonic frequency by means of the inductance of coil 12 and capacity of condensers 14 and 15. Condenser 14 is adjusted permanently at a capacity corresponding to the resonance point for the highest frequency desired for any beacon, corresponding to the highest frequency obtained from the variable crystal mounting 7, 8, 9. The capacity 15 in parallel with 14 variably adds sufficient capacity to maintain the circuit tuned down to the lowest frequency of the crystal.

The radio frequency energy is coupled to the tube 16 through condenser 17 and the plate coil 18 is tuned similarly to coil 12, by means of two condensers in parallel. The first of these condensers is shown at 19 adjusted for the highest frequency, while the two condensers 19 and 20 in parallel are adjusted for the lowest frequency. Link circuits 21 and 22 carry the high frequency energy to an antenna coil 23 similarly tuned by fixed condenser 25 and variable condenser 26 and the energy is fed to the antenna through the tuned feeders 27 and 28.

The variations of the cam 6 of the piezo electric crystal apparatus 7, 8, 9, as well as the periodic variation of condensers 15, 20, 26, is obtained by connecting all the rotating elements to the same shaft 5 of the motor 4 so as to obtain a perfect synchronism between all these tuning elements.

The antenna will radiate the continuously varying frequency according to a pattern depending on its physical shape.

While such an arrangement will emit a signal easily identifiable in a panoramic receiver, I further improve the beacon system of my invention by rendering the signal directional and sweeping with this beam within a certain angle around the beacon station. This angle can be a fraction of 360°, or the beam may rotate continuously around its axis as shown in Figs. 5, 5a and 5b. They show an antenna array supported by frame 29 angularly rotatable in supports 29a, projecting from standard 29b, composed of a vertical dipole 30 with reflector wires 31, 32, 33 and director wires 34, 35. The antenna structure is rotated by motor 4 heretofore explained in connection with Fig. 4 which drives through an extension of shaft 5 the system of pulleys 29c through belt 29d. Fig. 5b illustrates the manner of coordinating the movement of the directive antenna with the rotation of the periodically varying condenser system constituted by stators 47 and 48 and coacting rotor 49. Motor 4 drives through shaft 5 for rotating pulley 49a simultaneously with the operation of pulley 29c. Drive pulley 49a drives pulley 49b through belt 49c for rotating the set of rotor plates 49.

The pulley relationship is such as to obtain the same frequency when the array periodically passes through the same position.

Such an antenna array sends a rather narrow beam in substantially one direction. Each type of such a rotatable beam has certain types of applications and is capable of imparting certain additional information.

The continuously rotating beam in Fig. 5b can be made to give a certain frequency when it points in a certain direction; for example, its lowest frequency can be F, and I vary it by an increment of $f$ per degree of rotation increasing during 360° to F+360 $f$, and this abruptly comes back to F. If the frequency F is had when the beam points exactly north, an observer receiving the signal from this beacon will know the bearings from the frequency of the maximum signal obtainable in any one point.

As shown in Fig. 6, the whole array swings around the antenna 30 through an angle $\alpha$ when the wheel 36 is turning. The rotation of this wheel imparts a reciprocative movement to the link 38 through crank 37. Wheel 36 is driven by the same motor 4 through shaft 5 which periodically varies the frequency of the transmitter. The link and crank are so arranged that when the array is in one extreme position the frequency of the transmitter is also at one extreme of the band of frequencies which is swept and in the other extreme position of the antenna the frequency of the transmitter is at the other extreme of the band which is wept. This arrangement is used as shown hereinbelow, in guiding ships in a curvilinear path without the employment of a piloting cable.

The signal appears on the screen of the oscillograph of the panoramic receiver at a certain amplitude and, as it moves to one side, it passes through a maximum or through a minimum and then it disappears to repeat the same cycle in the next rotation. By coupling to the receiver a calibrated frequency generator to produce a signal of the same frequency with the maximum or minimum frequency of the signal received, or, still better, if the screen of the oscillograph is calibrated in frequency, respectively in degrees azimuth, the operator can read directly that frequency or degree which gives him the bearing in relation to that station. If the observer can obtain this information from two such beacons he can fix the exact position of the aircraft with respect thereto.

Such a beacon gives an infinite number of paths around it by which a pilot may navigate a straight line of flying in any direction away from or towards such a beacon station without the use of a compass or of a directional receiving antenna on board of the plane. In order to determine any definite direction in relation to a beacon, all that the pilot must do is to determine with the aid of his local calibrated oscillator in the panoramic receiver the position in which the observer receives the maximum signal from a beacon and keep the aircraft on that course so as to maintain the visual position of the signal on the oscillograph screen practically invariable. The off course position will be shown to one side or the other according to whether the oscillator signal appears to one side or the other of the maximum signal from the beacon. On the other hand, if the same frequency limits are used for a plurality of compass beacons of this type, the screen of the oscillograph of the panoramic receiver may be permanently calibrated directly in degrees giving simultaneously the azimuth to a plurality of stations.

The system described can be applied to other patterns of transmitting antennas, and the minimum or null point may be taken for the indication instead of maximum. I may employ, for example, a rotating figure eight or cardioid pattern. In the next part of this description, however, I shall refer to the "maximum signal" or "peak signal" only, it being understood that a "minimum signal" could as well be used to give the necessary indication, when such antenna patterns are used.

An antenna array which gives a unidirectional signal is particularly good and I prefer to use it with a rotating beacon which varies its frequency during 360° of the circle and at the end of the rotation jumps back to the original initial frequency. This can be obtained by the use of a mechanical arrangement which brings the condensers back to the original position or, still better, by a switching arrangement which alternately switches the condensers in circuit when they reach maximum or minimum capacity and puts in circuit another condenser which is in the reverse position.

The switching arrangement for a double condenser is shown in Figs. 8 and 9. Instead of using simple trimmer condensers such as 3, shown in Fig. 1, or condensers 15, 20, 26 of Fig. 4, I may use special double trimmer condensers as shown in Fig. 8 connected in a circuit as shown in Fig. 9. These condensers consist of a rotor plate 49 which rotates continuously as in the previously described transmitters, and two stator plates 47, 48 facing each other in such a manner that when the rotor 49 is fully engaged with relation to one stator, it is out of capacity position with relation to the other stator. An insulated cam 42 rotated by the same rotor shaft 5, driven by motor 4, acts upon either one or another switch arm 45a or 45b. These switch arms connect to stators 47 and 48 through the contacts 52 and 53 so that when one stator is in circuit the other one is out of circuit and vice-versa. The relationship of the cam and rotor position is such as to switch from one condenser when it is in a position of maximum capacity to the other one which is in a position of minimum capacity for every rotation of 360° of the antenna array system, during which time the condenser rotates only 180° so that the two are coupled together through a 2:1 ratio gear or pulley. The condensers rotate at half the angular speed of the antenna array as shown in Fig. 5b.

The frequency variation of the crystal is made to vary in synchronism with the rest of the system by operation of the cams 6, as previously described. The cams 6 may have flat or abruptly shaped face portions which allow the upper electrode 8 to snap back in position for every rotation of 360° of the antenna. The cams 6 rotate in synchronism with the antenna array.

The arrangement of frequency changing beacons imparts information to a navigator which gives the navigator a sense of security and confidence. In explaining my invention, a 360° rotating beacon sending a uni-directional signal on a frequency which varies continuously between 0° and 360° has been shown but any other combinations can be made, such as 180° beacons giving a two-directional signal or double beacons at different ratios of speed, so as to mark definite courses, etc. The navigator can receive the signal from one of the above described beacons on the screen of his panoramic receiver and, by way of example, these beacons may be regarded as giving a frequency comprised between 60–61.080 megacycles, giving 60 megacycles when the center of the beam points straight north (0°) and increases by 3 kilocycles per degree so that when the beam rotates 360° it has 61.080 megacycles and then suddenly snaps back to 60 megacycles.

The panoramic receiver is adjusted so as to cover exactly this band and a series of parallel vertical reference lines are graduated from 0 on the extreme left, corresponding to 60 megacycles, up to 360, corresponding to 61.080 megacycles. With an array of the type described giving a pattern as shown in Fig. 7, the signal will appear suddenly when the center of the beam is about 30° to one side. That signal will increase by about 9 decibels during those 30°, when the receiving station antenna is in the center of the beam and will decrease by the same amount during the next 30°. In other words, the observer will note on the screen of the oscillograph of the panoramic receiver a signal moving along 60 divisions, out of the 360°. The visual signal is reproduced on about 1/6 of the screen starting at a minimum, passing through a maximum, and disappearing for a determined period of time, then starting again through the same motion.

By reading the graduation corresponding to the maximum amplitude, the observer reads directly the angle between the meridian of the station and the straight line path extending to that station. The azimuth of the receiving station is obtained by adding 180° to the reading thus obtained. The screen may have the two calibrations appear thereon as shown on Fig. 14. If two stations are thus simultaneously obtained on the panoramic receiver, the position of the observer is thus determined; and if a third station can be detected, that position can be checked.

I will describe now a special type of panoramic receiver which instead of giving the readings of the angle on a straight line, gives it on a circle so that the observer can actually see on his panoramic receiver the direction of the signal. The receiving circuit and the associated control circuits for the oscillograph are shown in Fig. 12, which includes a panoramic receiver similar to the one shown in Fig. 1 of my copending application, Serial No. 196,520, supra, while the screen of the oscillograph is represented in Fig. 15.

In this receiver, however, instead of using a pulsating current produced by the charge of a condenser, I use an alternating current for the sweep voltage on the oscillograph. This alternating current is produced by an alternating current generator 83 rotated by motor 81. The shaft of this motor-generator set, is connected by means of a proper gear ratio coupling to the shaft 82 which drives the continuously rotating condensers 71 and 73 as well as a commutator 84, 85. One half of this commutator 84 is insulated, the other 85 is grounded through brush 86. The gearing is so arranged that the alternating current generator produces one complete alternating current cycle while the condensers 71, 73 pass from minimum capacity to maximum capacity, as shown by the chart in Fig. 13, and is grounded through commutator 84, 85 during the next cycle. This interrupted alternating current is fed through a transformer 55 and potentiometer 56 to an amplifying tube 57. The amplified interrupted alternating current is further passed through a transformer 58 and then fed to the deflecting plates 78a and 79b of the oscillograph 77. The other plates 78b and 79b are connected together and grounded and are also connected to point 59 of a phasing device across the transformer 58, so that this point is 90° out of phase with the plate 78a while being in phase with 79a. This phasing device is composed of capacitor 60 and resistor 61, the latter being so adjusted as to have a resistance equal to the reactance of condenser 60. The image obtained on the screen of the oscillograph 77 will be a circular pattern of larger or smaller diameter according to the amplification of the tube 57. The cathode resistance 62 is adjusted so as to operate the tube not far from the cut-off point as long as there is no signal coming through the grid return lead 63. This grid return, however, is connected to the diode rectifier of the panoramic receiver in such a manner that for any signal the grid 64 of tube 57 can become more negative with relation to the cathode, so as to further cut its amplification. It can be seen that as soon as a signal comes through the various circuits of the receiver to the diode, the amplification of the alternating current applied to the screen of the oscillograph decreases and the deflection of the spot decreases also; that is, the spot approaches the center of the screen, and the stronger the signal received, the closer this spot will approach its zero position, that is, the center of the screen.

As long as there is no signal, a circle appears. Any signal creates a deflection of the pattern towards the center, as represented in Fig. 15, this deflection increasing with the amplitude of the signal received. As each signal occurs at a moment that is synchronized with the generator 83, these signals will always appear in one position on the screen. I may arrange the control electrodes and circuits so that the frequency 60 megacycles is received when the spot is directly on top of the screen, as shown in Fig. 15, and when the condensers 71, 73 are in maximum capacity position. The frequency 61.080 is obtained again on top of the screen after the spot has traveled once around and the condensers have reached minimum capacity position indicated at the 180° stage in Fig. 13. During the next half cycle, while the condensers 71, 73 increase their capacity, there is no image on the screen because the generator 83 is connected to ground. Due to persistence of the vision and/or of the screen, however, the image persists until the next rotation. The observer can thus see each signal at its proper angular relation and the azimuth to each station by provision of a second set of figures about the outer circle shown in Fig. 15 by which position may be directly read.

A transparent map giving the relative position of each station can be readily mounted on the screen of the panoramic receiver, and by moving it or turning it around, the observer can locate the position of the receiving station by having two points of reference.

In many cases it is important for a navigator to guide the aircraft according to a path which may be winding or curvilinear. This path may be relatively narrow and the pilot can depart from a certain line only within certain limits without danger. There may be two way traffic along that relatively narrow path, and those headed in one direction have to keep to the right side of an imaginary central line.

In such cases, the pilot's main preoccupation is not as to the exact knowledge of his position at each moment, but what is more important, he should know how to steer each moment. My invention provides the navigator this information with great precision and it permits the guiding of planes or ships through narrow passes, harbors, or along a coast, advantageously replacing the cable guiding methods.

The principle of my method involves the transmission of two radio beams from two different points, these beams varying in frequency as they sweep along an imaginary line. The two beams are so correlated as to have the same frequency when they pass through the same point along that line. There need not be any time correlation between the two, and the transmitting stations operate quite independently of each other.

The principle appears clearly by referring to Figs. 10, 11 and 12. In Fig. 10 a curvilinear path L' through the channel is marked with a series of reference points along it, 1', 2' 3' ... 21'.

Two stations F and F¹ are each sending a beam with swinging antennae such as shown in Fig. 6, one sweeping an angle $\alpha$ and the other an angle $\alpha'$. For each station, a specially shaped condenser is used to vary its frequency range and rate. This condenser varies in synchronism with the movement of the antenna array so that for each position of this array, a definite frequency results.

The variation of frequency takes place between two limits, for example, $f_0$ and $f_1$. The highest frequency results when the specially shaped condensers are completely out and when the antenna patterns point their beam towards point 1' along the line of navigation. As each of the antenna arrays rotate, the specially shaped trimmer condensers rotate also and the frequency of each station changes, each passing through the same frequency when their beam passes along points 2', 3', 4' ... 21'. When the limit of rotation of antenna and condenser are reached (limits which are determined by the back and forth movement shown in Fig. 6), they start the reverse motion which brings both condenser and antenna through the same relative positions so that the same relationship is obtained between frequency and each point along the line. It can be seen that a navigator using a panoramic receiver, following the desired course is going to see periodically a signal from station F and another signal (at a different period of time) from station F¹.

These signals will vary in amplitude on the screen and each will pass through a maximum when each beam passes through the receiver location. If the two maximums occur on the same frequency for which the screen is graduated, it means that the receiver is exactly on the line L', Fig. 2a. If one signal gives a maximum of a slightly higher frequency than the other, the receiver is on the right or left side of the line. By referring to Fig. 10, it can be seen that by maintaining a constant difference between the two maximums, the navigator can maintain an aircraft on a parallel course and will know whether the aircraft is to the right or left and how far off the course, just by watching the difference between these maximums. This appears clearer in the views of the screens in Figs. 12a, 12b and 12c, in which it is shown how the signals appear on the screen, for an on course position $F=F'$, or left position $F>F'$, or right position $F<F'$.

In these figures, I have shown only the maximum signals for each station, although it will be understood that these signals appear somewhere to the right or left periodically. Also, I show them of unequal amplitude because one station may be nearer than the other, or of unequal power. The observer recognizes one station from another by the period of time from one appearance to another.

The relationship between the frequencies and the angle of each of the stations can be made such as to obtain a constant difference of frequency along any route parallel to an ideal route L', as shown in Fig. 10. In this drawing, I show other parallel routes in which L'' represents the inside limits within which a ship must navigate and L''' is a parallel route on the outside towards the sea. The various points 1', 2', 3', etc., along route L' and the points 1'', 2'', 3'', etc., along the route L'' have been obtained as follows:

A line from F' to a point 1' taken at random along route L' is drawn. This line cuts route L'' in point 2''. The line F—2'' gives point 2'; the line F'—2' gives point 3''; line F—3'' gives point 3', etc. On the points 1', 2', 3', 4', etc., the carrier frequencies of the signals coming from beacons F and F' are identical, whereas on the points 1'', 2'', 3'', etc., they differ by $\mu$ kilocycles. In other words, if in point 2', the peak signal received on the panoramic receiver from the two stations F and F' is the same, with $f=f'$, on point 2'' we will receive from station F the same peak frequency $f$ and from station F' the peak frequency $f'+\mu$. This same difference is maintained all along the line L''. The variations of the frequency with relation to the angles $\alpha$ and $\alpha'$ are in accordance with non-linear curves, which can be computed point by point along the lines. In other words, for station F the frequency varies by $$\frac{\mu}{\angle 2'F3'}$$

kilocycles per degree between points 2' and 3'; by $$\frac{\mu}{\angle 3'F4'}$$

kilocycles per degree between point 3' and 4', etc. For station F' the variation between the same points will be $$\frac{\mu}{\angle 2'F'3'}$$

and $$\frac{\mu}{\angle 3'F'4'}$$

etc., where the expression $\angle 2'F3'$, for example, designates the number of degrees for the angle formed by the lines 2'—F and F—3'.

This variation can be represented by two curves, as shown in Fig. 11, in which the relationship between frequency variation and angle $\alpha$ or $\alpha'$ is given. Frequencies can be converted into capacities, and these curves can be used for establishing the cam shape of the condensers, which give the necessary frequency change. It is clear from this explanation, that there is no need of any connection between the stations F and F'. They operate independently of each other, without any time synchronism. One station is recognized from the other according to the period of time per cycle for each station, which can be determined with a stop-watch mechanism.

If the course is very long or very irregular, a series of stations may be used, one working in conjunction with another or with several others.

Straight line routes can be obtained, as well as curved paths, and my method may advantageously replace the present type radio ranges as it gives much clearer indications as to the route followed, with visual on course and off course indications. The pilot knows at all times his exact position along his route from the frequency of the peak signal received, a frequency which gradually varies from point to point along said route.

By using bi-directional pattern transmitting antennae, two symmetrical courses are simultaneously created. In the above case, two parallel straight routes would result. In the same manner, closed figures can be obtained to determine cities, or airports or other important areas.

I have referred to the route as a line in order to simplify the explanations. It must be realized, however, that these routes are not merely lines but are vertical planes whose horizontal projections are represented by the lines mentioned. In the same manner, however, horizontal or inclined planes may be obtained, such planes giving indications as to the altitude of a flyer or serving for blind landing purposes.

In such a case, instead of varying only the horizontal pattern of the transmitting antenna, I provide means to also vary the vertical pattern. Two such stations used in combination can determine any desired path either for landing or for altitude determination.

In all the above explanations, as to the use of a panoramic receiver in connection with azimuth beacons or route-creating beacons, I have assumed that a plurality of beacons are using exactly the same frequency limits. As the panoramic receiver is extremely flexible, however, and can cover several bands, showing each band on a different portion of a screen, special applications may require beacons of entirely different frequencies for marking routes, or landing paths, or both. In this case, the two frequencies are represented on two different portions of the screen of the receiver, by means of a synchronous switching arrangement, such as described in my copending application, Serial No. 196,520; for example, on the top and bottom of the horizontal line, if horziontal projections are considered, or on the vertical line if vertical indications, such as altitude, are given; three dimensional indications can thus be had.

Fig. 11 shows in a diagram form, the variation of the frequency of each station F and F' for each degree of rotation of the respective antenna, or of the trimmer condenser which controls the frequency variation. This frequency variation for each angle is generally a non-linear function. For building up the transmitter after having established these curves and knowing the frequency limits desired, the cutting of the condenser plate which gives such a variation is a simple matter.

If for any reason the proper authorities controlling the courses of navigation, such as the Department of Commerce of the United States, desire to change the path established, it is only necessary to change the specially shaped condenser plate in each of the transmitters. This may be important in order to avoid stormy areas or obstructions, or for military purposes.

What has been said with respect to variable condensers applies also to the crystal or other electromechanical vibrator, such as shown in Figs. 3a, 3b, or 3c, in which the cam is cut so as to give the proper frequency for a certain angle of rotation, this cam being synchronized with the movement of the antenna array.

In Fig. 10, I have shown the system of my invention employed for marking a navigable course along a coast line or between mountainous passes or over other dangerous territory. I may, however, mark altitude levels for aircraft over moutainous or hilly territory so that a plane may be navigated along a course which is safe above certain dangerous obstructions. Reference is made to Fig. 16 which shows how altitude levels are marked over a mountainous territory. The principle is the same as the one shown in Fig. 10, except that horizontal planes are created. From the difference of frequency between peak signals the observer knows the altitude of the aircraft above ground whereas the ordinary altimeter gives the pilot the altitude above sea level. Furthermore, from the peak frequency received, the pilot knows about how far the aircraft is along the route. This applies also to the arrangement of Fig. 10. In other words, the pilot knows when the plane enters and when the plane goes out of that dangerous zone and can follow the progress of the aircraft through the several zones.

Inclined paths may be had for leading the aircraft to a landing field by varying both vertical and horizontal transmitting patterns of the beacons.

In Fig. 16 I have shown the multiplicity of beams progressively transmitted in different directions and intersecting to mark a series of actual altitude levels above a hilly or mountainous territory. The heavy black line indicates a reference level of, for example, 10,000 feet altitude, on which the peak signals coming from F and F' are of the same frequency. A series of parallel altitude levels are shown below and above so that the pilot can maintain his craft at all times at a safe height determined by the difference of frequencies between the peak signals he receives from stations F and F'.

The precision which can be obtained from these rotating beacons depends on two factors:

(a) The discrimination which can be obtained between two signals of two different amplitudes.

(b) The discrimination obtainable between two signals of different frequencies.

(a) The first factor is a function of the distance to the transmitter, the angle of the polar diagram of the transmitting antenna, the frequency used, the power of the transmitter and the sensitivity of the receiver. It can be expressed as a simple formula. We can admit that within the distances used and at a constant height the variation of the field strength, M in decibels, and distance D are a linear relation.
(1) $M = KD + A$ in which K is the slope of the line and varies with the frequency and A is another constant determined by the sensitivity of the set (zero level being the weakest signal detected) and the power of the station.

If the angular displacement which produces a total signal variation of M db. is of $\omega$ degrees (as determined by the polar diagram of the antenna), a 1 db. variation is caused by an angular displacement.

$$\alpha = \frac{\omega}{M} \quad (2)$$

Hence $$\alpha = \frac{\omega}{KD + A} \quad (3)$$

Let us see how this formula can be applied to a definite case. Let us consider a station of about 100 watts working on 125 mc. In such a case $K = -0.9$ and $A = 42$. (These figures are computed from report No. 2 of the Bureau of Air Commerce, January 1938, entitled: 125 mc. Aircraft traffic control tests at Indianapolis, by W. E. Jackson and J. C. Hromada. They have also been checked with other published results.)

For a Yagi antenna as described, $\omega = 30$. In this case:

D = 5 miles $\alpha = 0.8°$
D = 10 miles $\alpha = 0.9°$
D = 20 miles $\alpha = 1.25°$
D = 30 miles $\alpha = 2°$
D = 40 miles $\alpha = 5°$
D = 46.6 miles $\alpha =$ Undetermined The angular discrimination becomes sharper as we approach the station and is extremely sharp for distances below 25 miles.

(b) The frequency discrimination depends on the size of the screen and the clearness as well as steepness of the images. The latter is determined by the selectivity of the circuits and the width of the band covered.

One of the factors which should determine this width, is the stability of both transmitter and receiver.

There are many variants of this method of direct azimuth or route tracing beacons and no limitations are intended herein by their omission.

In the following claims, wherever the term "peak value" is used, it is meant to indicate either a maximum or a minimum in a periodically varying function.

While I have described certain preferred embodiments of my invention, I realize that many modifications and variations of my invention may be made and I intend no limitations upon my invention other than may be imposed by the scope of the appended claims.

What I claim as new and desire to secure by Letters Patent of the United States is as follows:

1. In a navigation system, a radio beacon transmission system which includes a plurality of simultaneously operated beacon stations, each of said stations having a high frequency oscillator constituting a source of unmodulated radio energy, a directional radiating system connected with each high frequency oscillator, means for recurrently varying the frequency of each said oscillator within predetermined frequency limits, means operative in synchronism with the aforesaid means for varying the directivity of said radiating system, the rate of said carrier frequency variation as well as the said frequency limits being characteristic for each station, and a radio receiving system comprising in combination with a signal receiving circuit, visual means for individually and simultaneously indicating the respective frequency variations of a plurality of said stations, for subsequently deriving therefrom individual and simultaneous identification of each as well as directivity information from several of said stations.

2. In a radio navigation system, a transmission system consisting of a plurality of radio signalling stations, each of said stations including a high frequency generator and radiating means for transmitting unmodulated radio frequency energy whose carrier frequency varies periodically within predetermined limits, the rate of carrier frequency variation being predetermined and the said limits of frequency variation being characteristic for each one of said stations, all of said stations being operative within a predetermined band of the frequency spectrum and a signal receiving system comprising in combination with a signal receiving circuit, visual means for individually and simultaneously indicating within the said predetermined band of the frequency spectrum the respective limits of frequency variations of each of a plurality of signals from said stations and the respective amplitude variations of said signals between the frequency limits in any location of the receiver with respect to said transmission system.

3. In a radio transmission and reception system a plurality of radio beacons distributed in different geographic locations, each of said beacons consisting of a radio frequency generator constituting a source of radio energy, a radiating system, and means for periodically varying the frequency of said radio energy between predetermined limits, said limits being common for a plurality of said radio beacons, the said variation of frequency taking place in each beacon at a different predetermined rate which individually characterizes the respective beacons constituting the system, and a radio receiving system having means for visually and simultaneously reproducing on an oscillograph screen a plurality of signals from said beacons, said signals appearing on said screen distinctively and in positions corresponding to the instantaneous frequency of the respective stations, each of said signals moving along said screen at a characteristic rate corresponding to its characteristic rate of frequency variation.

4. A radio beacon system comprising a plurality of radio beacon stations situated in different geographic locations and operative within a continuous band of frequencies, each of said stations including a radio frequency generator constituting a source of unmodulated radio energy, an antenna having a definite transmission pattern, means for periodically varying the frequency of said radio energy at a predetermined rate in respect to time, and synchronously operated means for varying the direction of propagation of the transmission pattern of said antenna, said variation of frequency taking place within characteristic predetermined limits at each of said stations; and a radio receiving system including in combination with a signal receiving circuit a cathode ray oscillograph with a screen, means for visually and simultaneously picturing on said screen all signals comprised within said continuous band of frequencies, the instantaneous amplitudes of each of said signals corresponding to its instantaneous integrated field strength and the instantaneous position of said signal on said screen corresponding to its instantaneous frequency, said signals moving along said screen at rates corresponding to their rates of frequency variation and between limits corresponding to their respectively characteristic frequency limits.

5. In combination, a radio beacon system including a plurality of radio beacons situated in different geographic locations, each of said beacons including a radio frequency generator system constituting a source of unmodulated radio energy, means for periodically varying the frequency of said energy within a continuous frequency band and between predetermined limits common to all of said beacons, the rate of said variation being characteristic for each individual beacon, directive radiating means, means for angularly orienting said radiating means within a determined angle with respect to a common geographic reference, and synchronizing means between said frequency varying means and said orienting means whereby a predetermined relationship is maintained for each of said beacons between its instantaneous frequency and the angular orientation of its radiating means; and a radio receiving system comprising in combination a signal receiving circuit, a cathode ray oscillograph having a screen, means for visually and simultaneously picturing on said screen all signals exceeding a certain field strength level and comprised within said predetermined frequency limits, each of said signals moving along said screen at an individually characteristic rate between two points corresponding to said frequency limits, the instantaneous position of each signal corresponding to its instantaneous frequency, and the amplitude of each signal varying according to the field strength variation as determined by the orientation of the respective radiating means, said rate of movement on said screen being interpretable for identifying each beacon and said amplitude variation for determining the angular orientation of said beacon.

6. A radio navigational system comprising two cooperative signal generating beacons located in different geographic poistions, each beacon provided with means for periodically varying its carrier frequency between the same predetermined limits, and each having directional and angularly orientable radiating means, and means synchronously operated with said first mentioned means for angularly orienting said radiating means within predetermined angles and at characteristic and independent rates of speed, the orientation of each of said radiating means for any given frequency being such as to direct a peak signal towards a common reference point, the location of said point being different for each frequency and varying in step with the frequency variation of said beacons along a geographically predetermined line.

7. A radio direction finding system comprising a plurality of radio transmitter stations operating on a common band of frequencies, and situated in different geographic locations, each station having means for periodically varying the carrier frequency of the signal emitted within the limits of said common band of frequencies at a rate characterizing it from other stations and an antenna having synchronized means for periodically changing the direction of signal emission for sending a signal on a different carrier frequency from each of said stations in respectively different directions with respect to a common reference; and a radio receiving apparatus having periodically varying tuning means and responsive to the emitted signals, the output of said receiving apparatus being connected to a cathode ray oscillograph having a screen, said tuning means being operative at a speed which results in substantially simultaneous visual indications from a plurality of said stations on said screen, the direction of each station being determined by the frequency of its peak signal.

8. A radio direction finding system comprising a radio station having a radio frequency generator constituting a source of unmodulated radio energy, a directive antenna system having a definite transmission pattern, means for periodically varying the frequency of said radio energy at a predetermined and characteristic rate in respect to time within predetermined frequency limits and synchronously operated means for varying the direction of propagation of unmodulated energy in the transmission pattern characteristic of said antenna system; and a signal receiving system, a cathode ray oscillograph including a cathode ray generator and a screen, a pulsating current generator, control means including said signal receiving system and said pulsating current generator operable for controlling the operation of said cathode ray oscillograph, means for recurrently tuning said signal receiving system over a frequency band including said frequency limits, means for synchronously operating said pulsating current generator and said tuning means for effecting a visual reproduction on said screen of the signal of said radio station, said visual reproduction moving along said screen at a characteristic rate corresponding to said characteristic rate of frequency variation and between limits corresponding to said predetermined frequency limits, the direction of said station with respect to said receiving system being determined by the frequency of the peak signal received.

9. In a system of navigation, a plurality of radio stations situated in different geographic locations, each of said stations including transmission means for transmitting signalling energy periodically varying in the angular orientation of its peak signal for complete 360° variation and synchronously varying in frequency between two predetermined frequency limits, said limits being common for all of said stations, said variation of frequency for each station being substantially proportional to said variation of angular orientation during each complete rotation, the limiting frequency values being reached for all of said stations for a predetermined angular orientation of their signalling energy with respect to a common reference, and the rate of frequency variation being individually characteristic for each station; and a receiving system carried aboard a mobile body and having periodically variable tuning means operative between the said predetermined frequency limits of said transmission means, a cathode ray oscillograph connected with said receiving system, deflecting electrodes for controlling the position of the cathode ray beam on a screen of said cathode ray oscillograph, means including said deflecting electrodes and synchronously operated with said periodically variable tuning means for circularly deflecting said cathode ray beam, the deflection of said beam being substantially proportional to the variation of frequency for which the said receiving system is responsive, said beam passing through one and the same radial reference line at both limiting values of said frequency band, each of a plurality of signals from said stations being indicated on said screen as separate deflections recurring at characteristic rates corresponding to the rates of frequency variation of the respective stations, said beam corresponding in instantaneous position and amplitude of deflection to the respective instantaneous frequency and orientation of each station, the angular position of the peak signal of each of said stations relative to said reference line determining the azimuth of said mobile body relative to the respective station.

10. A radio beacon system comprising a plurality of signal generators located in different geographic positions in cooperable relation with respect to a given navigable area, each generator being provided with means for periodically varying its frequency between the same predetermined limits but at different time rates characteristic for each beacon and each having a directional radiating system and means to angularly vary the orientation of the peak signal of said radiating system, individually selected means for connecting said first and second means at each of said beacons so as to obtain predetermined synchronous relationship between the angular orientation and frequency of each beacon, said relationship being determined for the several beacons in such manner that for any given frequency within said limits the peak signal of each of said beacons is angularly oriented towards a common reference point having a predetermined geographic location, the location of said point varying continuously with the variation of frequency along a geographically predetermined navigational line.

11. In a navigation system, a directional radio beacon whose frequency is comprised within a predetermined frequency range, said beacon having angularly orientable radiating means to indicate a direction within a predetermined plane, and a second directional beacon whose frequency is comprised within a different predetermined frequency range, said second beacon having angularly orientable radiating means to indicate a direction within a plane substantially normal to the first, an aircraft, a radio receiver mounted on said aircraft and having means for periodically and alternatingly tuning said receiver over the said separate frequency ranges, a cathode ray oscillograph connected with said receiver and having a cathode ray beam generator and a screen, a pair of deflecting elements, control means for said cathode ray beam including said deflecting elements, and connections between said tuning means and said control means for separately and substantially simultaneously reproducing on the screen of said oscillograph signals within the two said frequency ranges, including the signals from the said beacons.

12. In combination, a directional beacon system comprising a radio beacon varying simultaneously in frequency and direction of transmission within a given plane, and another radio beacon varying simultaneously in frequency and direction of transmission within a plane normal to the first, each of said beacons being operative within a different but predetermined range of the frequency spectrum, a radio receiver having a cathode ray oscillograph and a screen, and means for simultaneously showing on said screen the frequency and amplitude relationships of beacon signals received within both of said predetermined frequency ranges, for thereby simultaneously indicating direction within each of the said planes.

13. In combination with a plurality of variable frequency directional radio beacons, situated in different geographic locations and operative within the same predetermined frequency limits, a radio receiving system including means for periodically varying its instantaneous frequency response between said predetermined frequency limits, an oscillograph having a cathode ray beam generator and two sets of deflecting plates, an alternating current generator synchronously operated with the said first means, a phase changing device connected to said generator, connections from said phase changing device to said two sets of deflecting plates so as to obtain a substantially circular pattern on said oscillograph, and means energized by received signals for modulating said cathode ray beam according to the respective instantaneous field strengths of the various signals and distorting said circular pattern in predetermined positions corresponding to the respective instantaneous frequency of the signals from each of a plurality of beacons.

14. The method of locating a predetermined geographic point with the aid of a pair of radio beacons situated in different geographic locations which includes independently emitting at each of said geographic locations a non-modulated radio-frequency signal, recurrently varying the frequency of each of said signals within predetermined frequency limits, the rate of said variation and the frequency limits being predetermined and characteristic for each of said locations, directively radiating said signals, varying the directivity of radiation of each of said signals from said locations synchronously with said frequency variation for recurrently transmitting a peak radio signal in one and the same direction for one and the same characteristic frequency, monitoring along a navigational line a continuous portion of the frequency spectrum including said frequency limits, periodically receiving the signals from said locations, and converting said signals into individual electric impulses of instantaneous amplitudes corresponding to the field strengths of said signals, said electric impulses periodically varying in amplitude at any given point along said navigational line in step with the periodical variation of directivity of each signal with respect to said point, separating said impulses by time intervals characteristic of the instantaneous difference of frequency between them, converting said impulses into visual signals of amplitudes corresponding to the instantaneous amplitudes of said impulses, individually positioning each of said visual signals within one and the same field of vision at linear intervals characteristic of the said time intervals between them, said periodic reception being made at a rate which renders the observation of said visual signals substantially continuous and simultaneous, observing the position of the peak visual signals corresponding to the peak radio signals of characteristic frequency, said predetermined geographic point being located when a given predetermined combination of positions of said peak visual signals is obtained.

15. In a radio transmission and reception system a plurality of radio beacons distributed in different geographic locations, each of said beacons consisting of a radio frequency generator constituting a source of radio energy, a radiating system, and means for periodically varying the frequency of said radio energy between predetermined limits, said limits being characteristic for each of said radio beacons, the said variation of frequency taking place in each beacon at a predetermined rate, and a radio receiving system having means for visually and simultaneously reproducing on an oscillograph screen a plurality of signals from said beacons, said signals appearing on said screen distinctively and in positions corresponding to the instantaneous frequency of the respective stations, each of said signals moving along said screen within characteristic limits corresponding to its characteristic limits of frequency variation.

16. In a radio navigation system, the combination set forth in claim 2 wherein the radiation pattern of each radiating means is orientable with respect to a predetermined common reference, and including means for continuously varying the orientation of each radiation pattern in synchronism with the respective variation in carrier frequency, each of said stations having a predetermined relationship between the respective carrier frequency and the orientation of the radiation pattern.

17. The combination set forth in claim 5 wherein the said two points on the screen of said oscillograph, corresponding to said frequency limits, are superposed in one point, and the said means for picturing signals on said screen is operative to effect movement of said signals between the frequency limits in a circular path.

18. A radio navigational system comprising two cooperative signal generating beacons located in different geographic positions, each beacon provided with means for periodically varying its carrier frequency between the same predetermined limits, and each having directional and angularly orientable radiating means, and means synchronously operated with said first mentioned means for angularly orienting said radiating means within predetermined angles and at characteristic and independent rates of speed, the orientation of each of said radiating means for any given frequency being such as to direct a peak signal towards a common reference point, the location of said point being different for each frequency and varying in step with the frequency variation of said beacons along a geographically predetermined line, and a signal receiving system carried aboard a mobile body navigable along said line, said receiving system comprising a signal receiving circuit, a cathode ray oscillograph and a screen, means for visually and simultaneously picturing on said screen the signals from said cooperative beacons, the position of said signals varying along said screen according to their respective frequency variation and their amplitude varying according to the orientation of their respective radiating means, the position of said mobile body with respect to said predetermined line being indicated by the respective positions of the peak signals from said beacons.

19. In a radio navigational system, in combination with a plurality of directional beacons operating within the same predetermined frequency limits, said beacons being situated in different geographic locations, a receiving system including a non-directional antenna and a receiving circuit, rotatable means for periodically tuning said receiving circuit between said predetermined frequency limits, a cathode ray oscillograph including a cathode ray beam generator and a screen, means for generating a rotating field as said periodically rotating means is rotated, means for controlling said cathode ray oscillograph in accordance with said rotating field, the instantaneous angular displacement of said cathode ray beam with respect to a predetermined radial reference line on said screen corresponding to the instantaneous frequency response of said signal receiving circuit, and the instantaneous angular displacement of said cathode ray beam corresponding to an angle of zero degrees with respect to said reference line when the said signal receiving circuit responds to the said frequency limits, and means for modulating said beam in accordance with signalling energy received through said non-directional antenna.

20. The method of establishing a navigational route along a geographically predetermined line with the aid of a pair of beacons situated in different geographic locations, which includes directionally propagating from each of said locations a signal varying continuously and periodically in frequency within predetermined limits, said limits being common to both said signals, the rate of said variations being distinctively characteristic of each signal, and varying the frequency and the orientation of the peak signal from each location according to individually predetermined but cooperative relationships so that for any given frequency said peak signals are oriented towards a common point situated on said predetermined line, each point on said line being characterized by one frequency between said frequency limits.

21. The method of navigation with the aid of a plurality of radio beacons situated at different geographic locations and a radio receiver carried aboard a mobile body which includes directionally propagating from each of said locations a signal varying continuously and periodically in frequency within predetermined frequency limits, said limits being common for all of said signals, varying the peak signal from each location continuously and periodically in angular orientation with respect to a common reference, the relationship between frequency and angular orientation being predetermined for each signal, the rate of said frequency variation being also predetermined and serving to characterize each of said signals, all of said signals passing through one and the same frequency when the respective peak signals are oriented towards the said common reference, and visually and simultaneously observing aboard said mobile body the position with respect to a given reference of the indication of each of a plurality of said signals included in a continuous band within said frequency limits, each signal appearing at a continuously varying position corresponding to its continuously variable frequency, the instantaneous position of said mobile body with respect to said geographic locations being determined from the position of the corresponding peak signal of each of said beacons.

22. The method set forth in claim 21 and including the step of maintaining a predetermined relationship in the positions of the peak signals received for navigating said mobile body along a predetermined navigational line characterized by said predetermined relationship in the frequencies of said signals.

23. The method set forth in claim 21 wherein the said common reference is a point situated on a geographically predetermined navigational line, and wherein the said predetermined relationship between the frequency and the angular orientation of each signal is selected so that for any given frequency within said frequency limits, the peak signal from each of said locations is angularly oriented towards a different common reference point, the location of each of said points varying continuously in step with the said continuous variations of frequency in coincidence with said navigational line.

24. The method set forth in claim 21 wherein the said predetermined relationship between the frequency and the angular orientation of each signal is the same in all said signals.

25. The method set forth in claim 21 wherein the frequency of each signal varies with the orientation of the signal for 360° at the location of the beacon in accordance with $$F\omega = F + \frac{\omega(F' - F)}{360}$$

where $F_\omega$ is the frequency of the signal corresponding to an orientation of $\omega$ degrees with respect to said common reference and $F$ and $F'$ are the frequency limits.

26. The method set forth in claim 21 wherein the frequency of each signal varies with the orientation of the signal for 180° on each side of the said common reference at the location of the beacon in accordance with $$f\omega = F + \frac{\omega(F' - F)}{180}$$

where $f_\omega$ is one and the same signal frequency corresponding to an orientation of $+\omega$ or $-\omega$ degrees with respect to said common reference, and $F$ and $F'$ are the frequency limits.

27. The method of navigation with the aid of a pair of radio beacons situated in different geographic locations and a radio receiver including a cathode ray oscillograph, which includes independently emitting at each of said geographic locations, a non-modulated radio frequency signal, recurrently varying the frequency of each of said signals within predetermined frequency limits for each of said beacons, directively radiating said signals, varying the directivity of radiation of each of said signals in synchronism with its variation of frequency for recurrently radiating one and the same characteristic frequency in one and the same direction, and monitoring along a navigational line a continuous band of frequencies including the said beacon signals, each signal producing a current impulse whose varying amplitude is characteristic of its varying direction of radiation, separating said impulses as to time by intervals proportional to the frequency spacing between said signals, producing on the screen of said oscillograph visual and substantially simultaneous individual indications of said current impulses, separating said indications on said screen by linear intervals proportional to their time intervals, and deriving from said visual indications simultaneous directional indications from both of said beacons.

MARCEL WALLACE.